March 17, 1964  C. E. SCHMIDT  3,125,129
LOOM PICKER
Filed Jan. 17, 1962

INVENTOR.
Clayton E. Schmidt
BY
Roberts, Cushman & Grover
ATT'YS

United States Patent Office 3,125,129
Patented Mar. 17, 1964

3,125,129
LOOM PICKER
Clayton E. Schmidt, New Bedford, Mass., assignor to Schmidt Mfg. Co., New Bedford, Mass., a corporation of Massachusetts
Filed Jan. 17, 1962, Ser. No. 166,766
1 Claim. (Cl. 139—160)

This invention relates to pickers for looms and especially multiple shuttle looms in which the picker has an off-set striking head for propelling the shuttle.

In this type of loom the picker is guided in its back and forth motion by a rod parallel to the length of the lay, the striker head is off-set from the axis of the rod and the picker stick operates on the picker between the rod and the striking head to effect its movement, a construction which results in excessive wear on the guide rod hole in the picker and is aggravated by improper alignment of the guide rod, a condition which exists in a large percentage of the looms in operation. Various expedients were tried to alleviate this condition, such as employing a guide rod of hardened or special alloy steel, machining the surface of the rod to a high degree of smoothness, providing lubricating passages in the surface of the rod, employing lubricating glands, using specially hardened metal bushings and non-metallic bushings and the like, however, none of these have proved successful and pickers continue to be a major replacement item. With the advent of the plastic picker, replaceable bushings were inserted in the guide rod hole made, for example, of nylon, fiber, impregnated cloth, laminate, and the like, thus increasing the length of life of the picker very considerably by making it possible to remove the bushings when worn and replacing them with new bushings. Excessive wear of the bushings themselves however continues to be a troublesome problem, requiring frequent replacement which involves loss of time and expense. The imperfect shuttle motion resulting from binding and/or wear of the picker is, of course, reflected in imperfect weaving, a condition which is of prime importance to overcome.

The principal objects of this invention are to provide improved bearing structure for a picker which will improve the picker action and hence the quality of the weave; to provide improved bearing structure which will wear symmetrically in spite of the off-set application of the driving force to the picker, so that the entire bearing surfaces of the bearings will be effective in guiding the picker thereby reducing friction and wear; to provide an improved bearing structure which will compensate for any misalignment or irregularity in the rod thus eliminating binding; to provide an improved bearing structure which is easily replaceable when finally worn out thus minimizing time loss; and to provide an improved bearing structure for replaceably holding the bearing elements in the guide sleeve.

In accordance with the foregoing objects, the picker sleeve, which supports the picker on the guide rod for movement to and from the lay, is provided with axially spaced, universally movable bearing elements disposed near its opposite ends, each of which has a hole for slidably receiving the guide rod. More specifically, the sleeve contains recesses near its opposite ends, the surfaces of which are spherically curved and the bearing elements have outer surfaces of corresponding curvature which seat within the recesses and have their centers on the longitudinal axis of the sleeve. The picker is preferably comprised of a high molecular weight polyethylene and the bearings are comprised of a non-metallic material.

The invention will now be described in greater detail with reference to the accompanying drawings wherein.

Figures 1, 2:
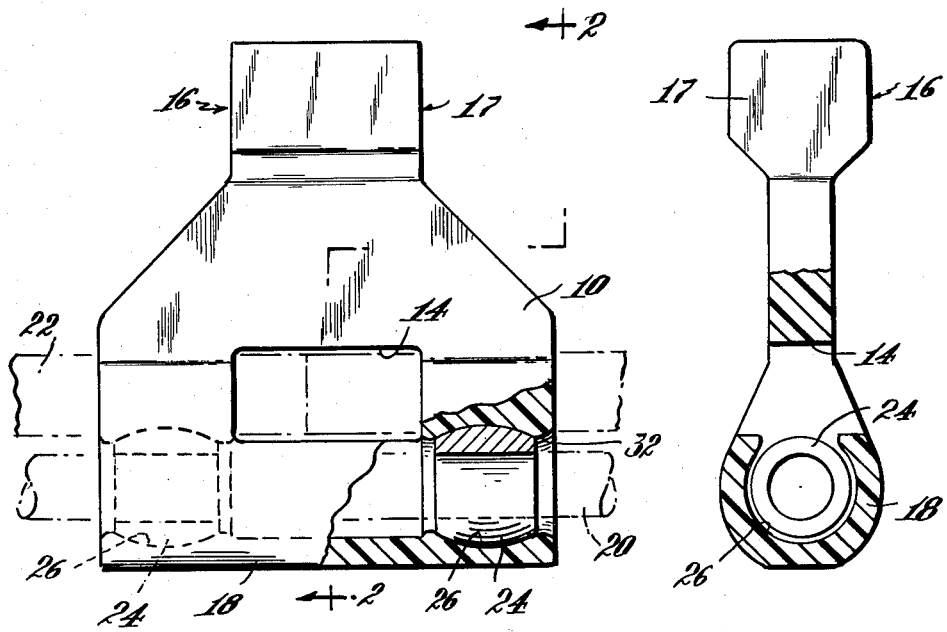
FIG. 1 is a plan view of a picker with a portion in section, showing a guide rod and picker stick in dot and dash lines.
FIG. 2 is a view taken on the line 2—2 of FIG. 1.

Referring to the drawings, the picker has a flat rigid body 10 containing a substantially rectangular opening 14, at one side of which there is a striking head 16 and at the other side of which there is a guide rod sleeve 18.

The picker is symmetrical with respect to a median line perpendicular to the axis of the sleeve and is adapted to slide back and forth on a guide rod 20 parallel to the length of the lay of a loom and to be propelled by a picker stick 22, the upper end of which projects upwardly through the opening 14. The head of the picker has a striking face, the plane of which is perpendicular to the length of the lay of the loom. Forward movement of the picker stick advances the picker along the guide rod so as to cause the striking face 17 of the head 16 to strike the end of the shuttle and drive it along the lay through the loom shed. The picker, as herein illustrated, is comprised of a high molecular weight polyethylene molded to the desired shape.

Figure 3:
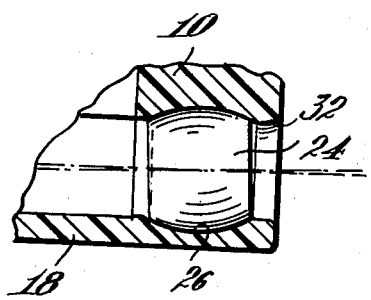
FIG. 3 is a fragmentary section of FIG. 1, showing the bearing element in elevation, tilted to accommodate itself to the axis of the guide rod.

In accordance with this invention, the sleeve 18, which supports the picker for movement along the guide rod 20, is provided with improved bearings 24—24 disposed in the sleeve adjacent its opposite ends within recesses 26—26. Each recess 26 has a curved surface which is spherical, the center of which lies on the axis of the sleeve. Each bearing element 24 has an outer surface which is correspondingly curved which rotatably fits into one of the recesses in the sleeve so that it is free to rock universally within the recess, for example as shown in FIG. 3. Each bearing element has also an axial, cylindrical opening 30 for slidably receiving the guide rod 20. Both inwardly and outwardly of each recess 26 the sleeve opening is of smaller diameter than the bearing element so as to retain the bearing elements in place. At the outer ends, the sleeve has diverging portions 32 to facilitate inserting the bearing elements into the recesses.

The plastic of which the picker is comprised is sufficiently rigid and durable to withstand the high impact required of it and yet is elastic enough so that a bearing element placed opposite the diverging portion 32 at the end of the sleeve can be pressed through the opening into the recess 26 and when once lodged therein will be held in place by contraction of the material. The bearing is thus held securely in position and yet is permitted to turn freely universally with respect to its center to align itself with the axis of the guide rod 20. When worn out the bearing elements may be easily removed and replaced.

The bearing elements, as thus provided, adjust themselves to the axis of the guide rod thereby eliminating binding action, utilizing the full bearing surface regardless of the alignment of the guide rod thereby reducing friction and hence wear, and improve the picker action and hence weaving.

Figure 6:
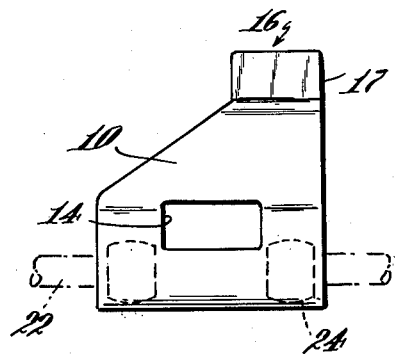
FIG. 6 is a plan view of a non-symmetrical picker.
Figure 4:
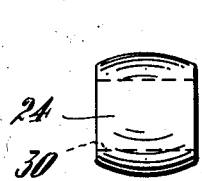
FIGS. 4 and 5 are an elevation and end view of a bearing element removed from the picker.
Figure 5:
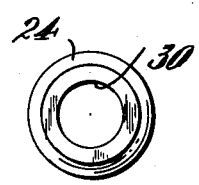

FIG. 6 shows a modification of the picker in which the head is non-symmetrically situated with respect to the bearings and in which the wear stresses developed are somewhat more aggravated than that shown in FIGS. 1 to 3 inclusive, and so in which the bearings described above are of a special significance.

As herein illustrated, the bearing elements are comprised of a non-metallic material, any of the long-wearing, highly abrasive-resistant resins being useable for this purpose, such as the acetal resins, cellulose acetate butyrate, epoxy resins, nylon, polypropylene, and the like.

While the picker has been described as being comprised of a polyethylene it is obvious that the self-aligning bearings could be employed to advantage in pickers made of any suitable material such as metal, wood, laminate and the like.

It should be understood that the present disclosure is for the purpose of illustration only and that this invention includes all modifications and equivalents which fall within the scope of the appended claim.

I claim:

A loom picker comprising a rigid body of high molecular weight polyethylene containing an aperture for receiving the end of a picker stick, an impact head at one side of the aperture, a guide sleeve at the other side of the aperture, said guide sleeve having near its ends spherically curved recesses, the cylindrical portions of the sleeve inwardly thereof being of lesser diameter than the maximum diameter of the spherically curved surfaces of the recesses, and the cylindrical portions of the sleeve outwardly of the recesses flaring from a diameter which is less than the diameter of the spherical curved surfaces to a greater diameter, and bearing elements disposed in said recesses, said bearing elements having spherically curved outer surfaces for rotatable engagement with the recesses whereby each bearing element is universally rotatable about a point on the axis of the sleeve, said bearings having cylindrical holes for slidably receiving a guide rod, said flaring portions of the sleeve facilitating the insertion of the bearings into the recesses.

References Cited in the file of this patent

UNITED STATES PATENTS

| | | |
|---|---|---|
| 1,574,724 | Zahn | Feb. 23, 1926 |
| 1,826,484 | Schultz | Oct. 6, 1931 |
| 2,487,780 | Bacon | Nov. 15, 1949 |
| 2,592,566 | Heim | Apr. 15, 1952 |
| 2,601,874 | Schwabe | July 1, 1952 |

FOREIGN PATENTS

| | | |
|---|---|---|
| 775,413 | Great Britain | May 22, 1957 |
| 788,039 | Great Britain | Dec. 18, 1957 |
| 851,327 | Great Britain | Oct. 12, 1960 |
| 857,764 | Great Britain | Jan. 4, 1961 |
| 864,223 | Great Britain | Mar. 29, 1961 |